(12) United States Patent
Wang

(10) Patent No.: US 9,148,270 B2
(45) Date of Patent: *Sep. 29, 2015

(54) METHOD AND APPARATUS FOR HANDLING DATA FLOW IN A MULTI-CHIP ENVIRONMENT USING AN INTERCHIP INTERFACE

(71) Applicant: Broadcom Corporation, Irvine, CA (US)

(72) Inventor: Yan Wang, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,804

(22) Filed: Mar. 4, 2014

(65) Prior Publication Data

US 2014/0185593 A1 Jul. 3, 2014

Related U.S. Application Data

(63) Continuation of application No. 13/165,417, filed on Jun. 21, 2011, now Pat. No. 8,683,100.

(51) Int. Cl.
*G06F 3/00* (2006.01)
*H04L 5/00* (2006.01)
*G06F 9/46* (2006.01)
*G06F 13/40* (2006.01)
*G06F 13/362* (2006.01)

(52) U.S. Cl.
CPC .............. *H04L 5/0058* (2013.01); *G06F 3/00* (2013.01); *G06F 9/46* (2013.01); *G06F 13/3625* (2013.01); *G06F 13/4031* (2013.01)

(58) Field of Classification Search
CPC ............ G06F 13/1605; G06F 13/4031; G06F 13/3625; G06F 13/364
USPC .................................. 710/45, 309; 370/395.4
See application file for complete search history.

(56) References Cited

U.S. PATENT DOCUMENTS

| | | | |
|---|---|---|---|
| 5,528,764 | A | 6/1996 | Heil |
| 6,163,831 | A | 12/2000 | Kermani |
| 6,868,486 | B1 | 3/2005 | Ward |
| 8,156,260 | B2 | 4/2012 | Ogawa |
| 8,397,006 | B2 | 3/2013 | Eckermann |
| 2004/0218600 | A1 | 11/2004 | Alasti et al. |
| 2005/0080999 | A1 | 4/2005 | Angsmark et al. |
| 2008/0126600 | A1 | 5/2008 | Mitchell et al. |
| 2012/0179880 | A1 | 7/2012 | Ware et al. |

*Primary Examiner* — Ernest Unelus
(74) *Attorney, Agent, or Firm* — Sterne, Kessler, Goldstein & Fox P.L.L.C.

(57) ABSTRACT

A processing system includes an interchip interface that comprises an interchip interface module having an arbiter to allocate a dedicated time slice in every fixed number of time slices, to assign a first priority to store data item(s) from a first-type channel having a first datapath width in memory during the dedicated time slice. In the remaining time slices of the fixed number of time slices, the arbiter further arbitrates among multiple channels of one or more types other than a first type, where the multiple channels correspond to at least one datapath width different from the first datapath width, and channels with wider datapath win the arbitration. The arbiter further arbitrates among two or more channels of the same type if a certain type of channel(s) wins the arbitration in a time slice. A method for implementing the same is also disclosed.

20 Claims, 11 Drawing Sheets

METHOD AND APPARATUS FOR HANDLING DATA FLOW IN A MULTI-CHIP ENVIRONMENT USING AN INTERCHIP INTERFACE

CROSS REFERENCE TO RELATED APPLICATIONS

This application is a continuation of U.S. patent application Ser. No. 13/165,417, filed Jun. 21, 2011, which is hereby incorporated by reference in its entirety.

FIELD

This disclosure is directed towards integrated circuits for network traffic processing, and more particularly to techniques for handling identifications of requests for operations to be performed by a remote processor.

BACKGROUND

Today's networking components process numerous different flows (e.g. groups of packets originating from a common source) for implementing high-performance networking. As time progresses, the speed at which networking traffic flows increases, and accordingly the rate at which networking traffic may be processed should increase. In some cases, an integrated networking functions operation might be processed in batches (e.g. by storing the packets of a flow, and later processing the stored packets), and in other cases it is desirable to process the integrated networking functions operation at wire speed.

As the demand for higher throughput of traffic flow increases, networking or communication systems are often scaled to include multiple processing systems or units, such as multiple network processors, in a single networking or communication system. Various data or information may be formed into one or more packets or datagrams to be transmitted across the physical boundaries of one processing system or unit to another processing system or unit via a plurality of communication channels. These communication channels transmitting or receiving data or information to or from another processing system or unit nevertheless may correspond to different datapath widths.

Therefore, there is a need for handling data flow with multiple datapath widths. Moreover, there is also a need for handling data flow with multiple datapath widths in a multichip environment with an interchip interface module that interconnects one processing system or unit (hereinafter processing system) to another processing system.

BRIEF DESCRIPTION OF THE DRAWINGS

Novel features are set forth in the appended claims. Nonetheless, for purpose of explanation, reference is made to specific embodiments thereof, which are illustrated in the accompanying drawings, in which:

SUMMARY

Figure 1:
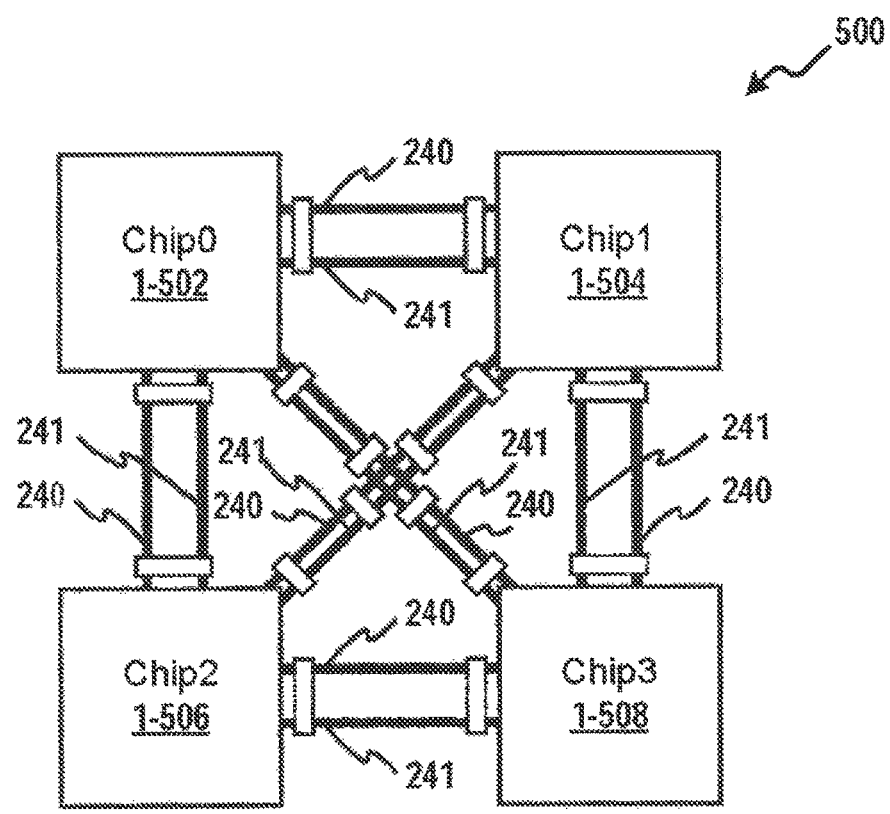
FIG. 1 depicts a processing system having multiple instances of a processing system interconnected in a mesh, according to one embodiment.

Disclosed are various embodiments relating to methods and apparatus for handling data flow from a plurality of communication channels. The apparatus comprises an interchip interface module. The interchip interface module includes one or more ingress ports that are interconnected to various modules of a processing system. The various modules may correspond to two or more types of communication channels, each type having a different datapath width, that transmit data or information from one processing system to another processing system and to receive data or information at one processing system from another processing system. The interchip interface module also includes an arbitration module which arbitrates among multiple communication channels to determine which communication channel's data items will be written to a memory element in the interchip interface module during which particular time slice. The interchip interface module may further comprise multiple buffers, each of which corresponds to a communication channel. The interchip interface module may further comprise one or more egress ports through which data items are transmitted from one processing system to another processing system.

The system performs a process that includes assigning a dedicated time slice once in every fixed number of time slices to a first type of communication channel (referred to herein as a first-type communication channel) and assigning a first priority to the first-type communication channel. In the remaining one or more time slices of the fixed number of time slices, the process further comprises arbitrating among one or more communication channels of one or more types other than the first type. In the remaining one or more time slices, the process does not arbitrate any first-type communication channels unless no communication channels of other types are eligible for arbitration. In some embodiments where a specific type of communication channel is selected and multiple communication channels of that specific type are eligible for arbitration, the process further arbitrates among these multiple communication channels to determine which specific communication channel of the specific type has the priority in a particular time slice.

DETAILED DESCRIPTION

In the following description, numerous details are set forth for purpose of explanation. However, one of ordinary skill in the art will realize that various embodiments may be practiced without the use of these specific details. In other instances, well known structures and devices are shown in block diagram form in order to not obscure the description with unnecessary detail. For example, while some embodiments disclosed in this document are described in the context of networking components, it is noted that the present disclosure has broad applicability to other applications and contexts as well.

Disclosed are various embodiments or exemplary implementations relating to methods and apparatus for handling data flow from a plurality of communication channels in various embodiments. The apparatus comprises an interchip interface module having one or more egress ports in some embodiments. The interchip interface module includes one or more ingress ports that are interconnected to various modules of a processing system. The various modules may correspond to two or more types of communication channels, each type having a different datapath width, that transmit data or information from one processing system to another processing system and to receive data or information at one processing system from another processing system. It shall be noted that although certain embodiments are described with reference to an interchip interface module that interconnects one processing system to another, the processes, hardware structure, or combinations thereof may be employed to handle data flow from a plurality of communication channels of a plurality of types and are not necessarily limited handling data flow between multiple processing chips using one or more interchip interface modules.

In handling data flow from a plurality of communication channels, various processes, modules, or a combinations thereof (hereinafter "module" or "modules" collectively) assign or identify a dedicated time slice once in every fixed number of time slices to a first type communication channel and assigning a first priority to the first type communication channel. In the remaining one or more time slices of the fixed number of time slices, various modules arbitrate among one or more communication channels of one or more types other than the first type communication channel. In the remaining one or more time slices, various modules do not arbitrate any first type communication channels unless no communication channels of other types are eligible for arbitration. In some embodiments where a specific type of communication channel is selected and multiple communication channels of that specific type are eligible for arbitration, various modules further arbitrate among these multiple communication channels to determine which specific communication channel of the specific type has the priority in a particular time slice.

Figure 9:
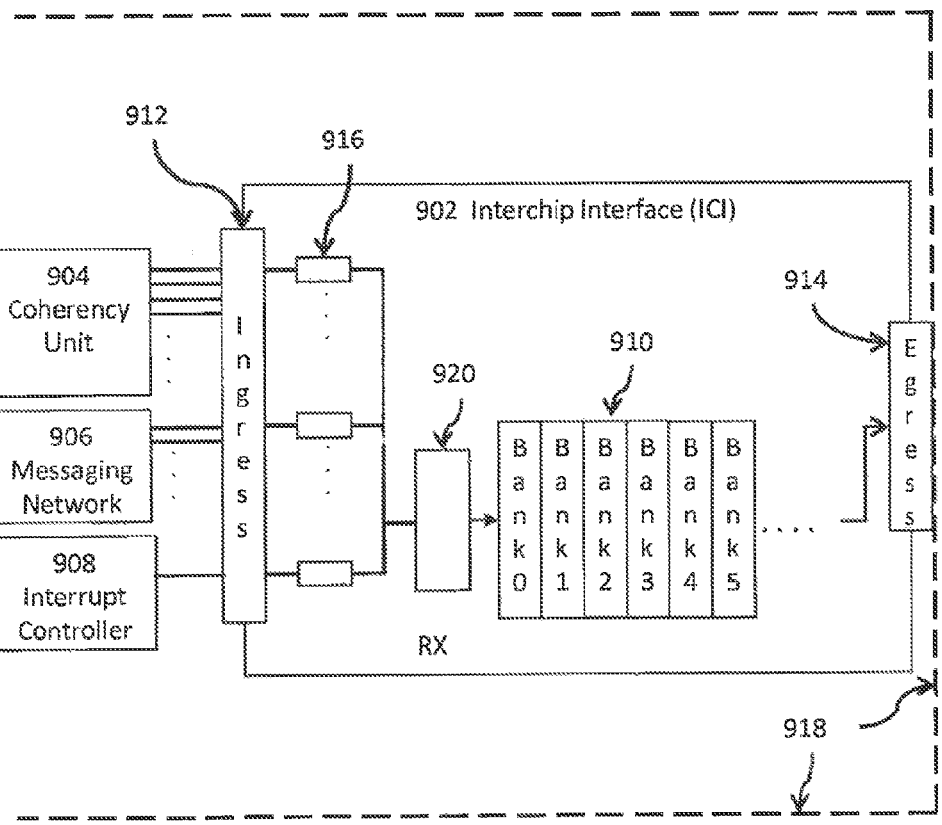
FIG. 9 illustrates a schematic representation of a hardware structure implementing the process for handling data flow from a plurality of communication channels in some embodiments.

FIG. 9 illustrates a schematic representation of a hardware structure implementing the process for handling data flow from a plurality of communication channels in some embodiments. In this exemplary implementation, the hardware structure comprise an interchip interface 902 having a memory element with a plurality of memory banks 910. The interchip interface 902 further comprises one or more ingress ports 912 that receive data from various modules such as a coherency unit 904, a messaging network 906, an interrupt controller 908, etc. in some embodiments, each of the modules may correspond to one or more communication channels to send data to and receive data from the interchip interface 902.

For example, the coherency unit 904 may correspond to eight first-type communication channels each of which has a first (e.g., 144-bit) datapath width, the messaging network 906 may correspond to four second-type communication channels each of which has a second (e.g., 64-bit) datapath width narrower than the first width, and the interrupt controller 908 may correspond to one third-type communication channel having a third (e.g., 32-bit) datapath width narrower than (e.g., half of) the second width in some exemplary implementations. Each communication channel of any type may be further operatively connected to a buffer (916) in some embodiments.

In some embodiments where the data crosses between clock domains when entering into the interchip interface 902, the buffer 916 comprises a first-in first-out (FIFO) buffer memory. The data items are transmitted from one or more communication channels of the modules 904, 906, or 908 through the corresponding buffer 916 and are stored into the memory element 910 in accordance with the processes described herein. The data items in the memory element 910 may subsequently be transmitted to one or more egress ports 914 and to another chip such as another processing system.

The interchip interface 902 may further comprise a logic module 920, such as an arbiter, for performing various actions of assigning priorities, various determinations, various updating actions, various actions of performing scheduling discipline, or various actions of arbitrating among communicating channels. The dashed lines 918 indicate the physical boundaries of a processing system, such as a processing system 100E as described in FIG. 2. The flow direction of the data item illustrated in FIG. 9 indicates READ operations of the interchip interface ICI, where the data flow direction of WRITE operations is in the reverse direction of that of the READ operations. In some embodiments, the approach only arbitrates the READ operations and does not arbitrate the WRITE operations.

The techniques disclosed herein may be used for implementing integrated networking functions operation at wire speed, or they may be used for implementing other processing tasks where there is at least some parallelism in the processing.

For example, a networking component might be directed to an application for providing a firewall, and the processing of flows might be assigned to multiple cores and multiple threads (for example) based on the flow. As another example, a networking component might be directed to an application for providing anti-virus protection using look-up tables, and the state processing might be assigned to (or multiplexed on) one or more look-up tables (e.g. memory) based on the state.

A networking component for providing integrated networking functions operation at wire speed can exploit certain parallelisms on specially designed and configured hardware. Further, in some cases it is convenient to mix exploitation techniques whereby flow switching is accomplished via flows assigned to multiple cores and multiple instruction processing threads while, concurrently, state switching is accomplished via exploiting parallelisms for state processing using customized hardware (e.g. customized special-purpose engines and/or memories).

In some cases, content addressable memory (CAM) devices are used in network switching and routing applications (for example, to determine forwarding destinations for data packets) and are also used to provide more advanced integrated networking functions operations (e.g. IPSecurity operations, virus scan, authentication, intrusion detection, deep packet inspection, etc.). In still other cases, content addressable memory (CAM) devices are used for quality of service (QoS) functions such as traffic shaping, traffic policing, rate limiting, and so on.

Various embodiments disclosed herein practice techniques for organizing networking components to process numerous different flows (e.g. groups of packets originating from a common source), and the networking components can include one or more CPU devices and one or more hardware accelerators and one or more CAM devices.

The speed with which a CPU device or a hardware accelerator can switch between different flows is typically dependent upon the architecture of the context-switching hardware as well as aspects of memory management. Accordingly, the disclosure herein describes apparatuses and methods to improve the parallelism of networking components, and more particularly to improve the speed with which flows, states and other information may be switched. One such technique involves the use of communication rings.

FIG. 1 depicts a processing system 500 having multiple instances of processing system 100E (illustrated in further details in FIG. 2) interconnected in a mesh, and communicating over an interchip link 240, and communicating over an interchip coherency link 241 according to one embodiment. As shown, each of the four instances of processing system 100E (e.g. Chip0 1-502, Chip1 1-504, Chip2 1-506, and Chip3 1-508) is connected to each other instance of a processing system 100E in the mesh. Each processing system 100E in FIG. 1 comprises three interchip interfaces, each of which connects the processing system 100E to another processing system, which may be another processing system 100E or any other processing systems. In some embodiments, although FIG. 1 depicts the link 240 and the link 241 as two separate links, the interchip link 240 and the interchip coherency link 241 actually share one single bidirectional link such that one processing system uses the same data path to communicate with another processing system with a single link. In these embodiments, there exists only a single link between any two processing systems.

Figure 2:
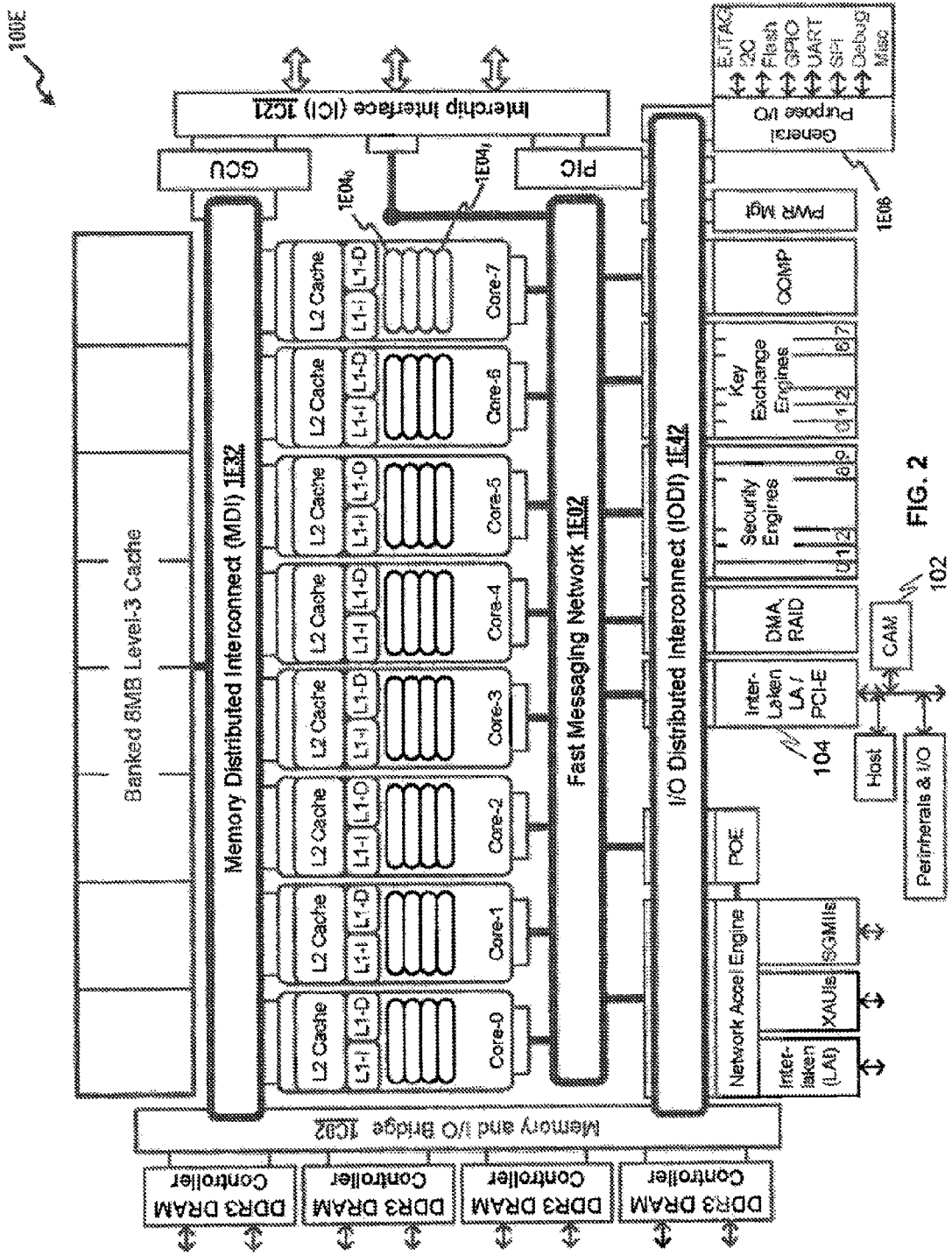
FIG. 2 depicts a processing system having a plurality of communication rings, CPUs, accelerators, and ID blocks, according to one embodiment.

FIG. 2 depicts a processing system 100E, according to an embodiment having three bidirectional communication rings 1E32, 1E02, and 1E42 (each depicted as a bold-line oval), a plurality of CPUs (e.g. Core-0, Core-1, etc.), a plurality of accelerators (e.g. Network Accel Engine, Packet Ordering Engine (POE), Interlaken-Look Aside Interface Module (Interlaken-LAI), etc.) to perform a set of operations, and a plurality of 10 blocks (e.g. Interchip Interface module (ICI) 1E21, general purpose I/O 1E06, etc.). The three rings may be used for referring to and/or moving packets within the context of an on-chip network.

As shown, each instance of the plurality of CPUs (e.g. Core-0, Core-1, etc.) comprises its respective level two cache (e.g. the respective L2 cache, as shown), and comprises its respective level one cache for instructions (e.g. the respective L1-I cache) and its respective level one cache for data (e.g. the respective L1-D cache). Each of the CPUs has a plurality of virtual CPUs (e.g. $1E04_0$, . . . $1E04_3$) depicted as an oval within a core.

In some embodiments, the Memory Distributed Interconnect 1E32 (MDI) comprises a memory interconnect ring 132, the Messaging Network 1E02 comprises a messaging ring, and the I/O distributed interconnect 1E42 (1OD1) comprises an 10 interconnect ring.

Also shown is a packet ordering engine (POE) to distribute packets in a particular order to a networking output. In this embodiment, the POE connects to the network acceleration engine (shown as, Network Accel Engine).

In the embodiment shown, the processing system 100E includes an L3 cache to connect to the MDI (Memory Distributed Interconnect) ring 1E32. The interconnect serves to connect memory elements to other memory elements, possibly using a message station or direct memory access logic. For example, in some embodiments, an instance of a CPU (Central Processing Unit, e.g., Core-0) includes one or more cache memories local to the CPU, and the local cache may be connected to the Memory Distributed Interconnect 1E32 ring. The MDI 1E32 ring may be configured to any width, including any width of any interconnected memory, or even multiples of widths of any interconnected memory, or even fractions of the width of any interconnected memory.

The processing system 100E depicts an I/O distributed interconnect 1E42, which I/O distributed interconnect 1E42 serves to connect 10 blocks (e.g. PCI-E, POE, etc.) and accelerators (e.g. security engines) to each other, and to the messaging network (as shown).

The accelerators may be located and configured to perform any specific operation. In some cases, one or more accelerators may be configured to perform such a specific operation autonomously (e.g. without intra-operation intervention by a CPU) and, in some cases, one or more accelerators may be configured to perform operations under programmatic control, which programmatic control may be implemented in any combination of configuration registers and sequencing units (e.g. a finite state machine, a micro-sequencer, etc.). The Interlaken LA/PCI-E (104) may be a single module or two separate modules. The Interlaken LA (Interlaken Look-Aside Module) of 104 may be individually enabled or disabled while the PCI-E is always enabled in some embodiments. The Interlaken LA/PCI-E (104) interacts with a number of devices that are outside the boundary of the processing system 100E, and the number of devices may include, for example, a content-addressable memory (CAM) or any look-aside devices (102), a host, and peripherals and I/O.

In addition, a plurality of instances of the processing system 100E sends messages to each other over interchip links via one or more interchip interface (ICI) 1E21 in some embodiments. In the exemplary implementation of interconnecting four processing systems 100E illustrated in FIG. 1, each of the four processing system comprises at least three interchip interfaces (1E21), each of which is used to interconnect the processing system 100E to another processing system, which may be another processing system 100E or other types of processing systems. More details about the interchip interface 1E21 will be described in greater details in some of the subsequent paragraphs with reference to one or more drawing figures.

Figure 3:
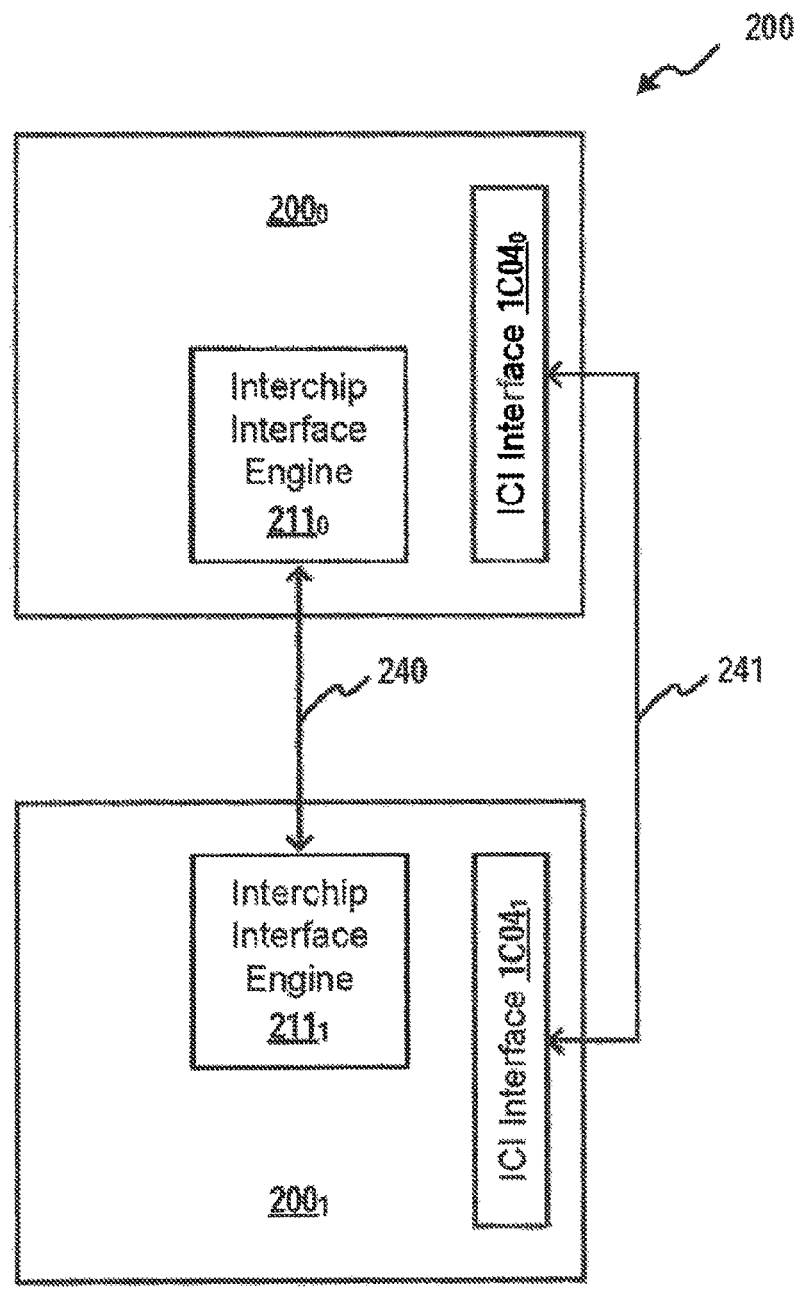
FIG. 3 depicts a processing system having two instances of the processing system of FIG. 2, according to one embodiment.

FIG. 3 illustrates a system 200 having two instances of the processing system of FIG. 2, according to one embodiment. More particularly, FIG. 3 depicts a processing system 200 having two instances of processing system 100C, namely processing system 2000 and processing system 2001, communicating over an interchip link 240 and/or communicating over an interchip coherency link 241, according to one embodiment.

In one embodiment, the interchip link 240 and interchip coherency link 241 gluelessly connect up to four chips having only one hop between any two chips. The links allow for non-unified memory access (NUMA) and preserve coherence for memory and caches. Packets may be processed by CPUs in any chip. The chips' internal ring networks pass messages and interrupts to local nodes and/or remote nodes. In some embodiments, although FIG. 3 depicts the link 240 and the link 241 as two separate links, the interchip link 240 and the interchip coherency link 241 actually share one single link such that one processing system uses the same data path to communicate with another processing system with a single link. In some embodiments, link 241 is not needed. In these embodiments, there exists only a single link between any two processing systems.

From the above descriptions, a processing system may be constructed having a plurality of CPU cores, a memory (e.g. DRAM or L3 cache, etc.), and one or more accelerators. The processing system has a first bidirectional communication ring (e.g. messaging ring 1E02) electrically connected to at least two of the plurality of CPU cores; a second bidirectional communication ring (e.g. memory interconnect ring 1E32) electrically connected to at least two of the plurality of CPU cores, and also electrically connected to the memory; and a third bidirectional communication ring (e.g. 10 interconnect ring 1E42) electrically connected to the at least one accelerator. Such a processing system can further include a messaging switch electrically connected to the second bidirectional communication ring and electrically connected to the third bidirectional communication ring.

Figure 4:
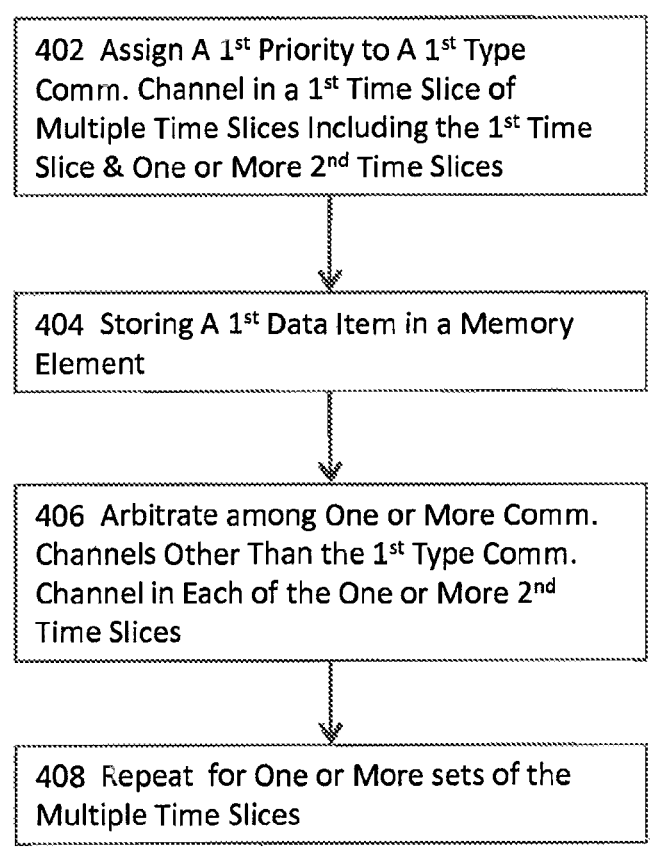
FIG. 4 illustrates a high level flow diagram of a process for handling data flow from a plurality of communication channels in some embodiments.

FIG. 4 illustrates a high level flow diagram of an approach for handling data flow from a plurality of communication channels such as the communication channels from the coherency unit (904), the messaging network (906), or the interrupt controller (908) to the one or more plurality of ingress ports (912) illustrated in FIG. 9 in some embodiments. Various embodiments described herein refer to communication channels of various types such as a first-type communication channel, a second-type communication channel, etc. In these embodiments, a specific type of communication channel corresponds to a communication channel with a specific datapath width. For example, a first-type communication channel may refer to a communication channel or a virtual channel having a 144-bit datapath width, a second-type communication channel may refer to a physical communication channel or a virtual channel (hereinafter a "communication channel") having a 64-bit datapath width, a third-type communication channel may refer to a communication channel having a 32-bit data path width in some embodiments. In some embodiments, a specific type of communication channel may comprise a communication channel that is used to transmit data that have been prepared to be of certain size. For example, a first-type communication channel may comprise a communication channel that is to transfer 144-bit data packets or datagrams (collectively "data packet" or "data packets"); a second-type communication channel may comprise a communication channel that is to transfer 64-bit data packets; and a third-type communication channel may comprise a communication channel that is to transfer 32-bit data packets in some embodiments.

In one or more embodiments, the approach for handling data flow from a plurality of communication channels comprises the process or module 402 for assigning a first priority to a first-type communication channel in a first time slice or time slot (hereinafter time slice) of a set of multiple time slices that includes the first time slice and one or more second time slices. In some embodiments, the approach may further comprise the respective process or module 404 of storing a first data item in a memory element. For example, the approach may store the first data item from the first-type communication channel into a memory element such as one or more of the memory banks (910) illustrated in FIG. 9 during the first time slice in some embodiments. In some embodiments, one of the objectives of various embodiments is to match the incoming data rate at the ingress port(s) with the outgoing data rate at the egress port(s). In these embodiments, the storage of the first data item from the first-type communication channel into the memory element occurs during the first time slice. In some other embodiments where there may exist some discrepancies between the incoming data rate and the outgoing data rate, these embodiments may further incorporate additional memory element(s) (e.g., one or more buffer memory modules) to temporarily hold one or more data items that are to be written into or read from the memory element (e.g., one or more memory banks 910 of FIG. 9). In these embodiments, the process or module of storing the first data element may be initiated or invoked during the first time slice but may be completed in a subsequent time slice. It shall be noted that the term "process" generally refers to a software process, and that the term "module" generally refers to a pure hardware implementation or a combination of hardware implementation and one or more software elements to perform various processes or actions throughout this disclosure.

In some embodiments, the memory element comprises a plurality of memory banks. In some embodiments, a data item may comprise a packet of a certain length, a plurality of packets, one or more control words of a fixed length, one or more segments of a packet as created by packet segmentation, one or more datagrams, or any other types of data or information transmitted between two semiconductor chips (e.g., two processing systems) and are collectively referred to as a "data item" in this disclosure. The number of memory banks in the memory element is determined based at least in part upon various widths of input datapaths from various components or modules of the processing system (e.g., 100E) or the output datapath width of, for example, the interchip interface such that the input data rate may exactly or closely match the output data rate of the interchip interface.

For example, in a processing system that comprises 32-bit, 64-bit, 128-bit, and 144-bit datapath widths for communication channels into the interchip interface with, for example, a 128-bit or 144-bit output datapath width, the memory element comprises five memory banks in some embodiments and six memory banks in some other embodiments, where each memory bank has a 32-bit width. It shall be noted that other configurations, such as having a memory bank with 16-bit width or other datapath widths other than the ones listed above, may also be used and shall be considered as within the scope of this disclosure. It shall be noted that although some embodiments specifically include an interchip interface, the process or the hardware structure described in this disclosure may be used to handle network traffic flow with communication channels having multiple datapath widths.

In some embodiments, the approach may further comprise the respective process or module 406 of arbitrating among one or more communication channels other than the first-type communication channels in each of the one or more second time slices. In some embodiments, the approach may further comprise the respective process or module 408 of repeating the actions 402, 404, and 406 for one or more sets of the multiple time slices. In some embodiments, the multiple time slices may be predetermined based at least in part upon the objective of maximizing the throughput with the various modules in the processing system (e.g., 100E) and the operating environment such as the expected data flow through the processing system.

In some embodiments, the number of multiple time slices may be programmable to cope with changes in the various modules in the processing system or changes in the operating environment. For example, the approach may be implemented to repeat the actions disclosed herein once every four time slices based at least in part upon various modules disclosed in the processing system. In some embodiments, various types of communication channels may comprise one or more virtual channels. A virtual channel enables transmission facilities (e.g., a network facility) to be shared and may comprise a dynamically variable network connection in which sequential data packets or segments thereof may be routed differently during the course of a virtual connection.

Figure 5:
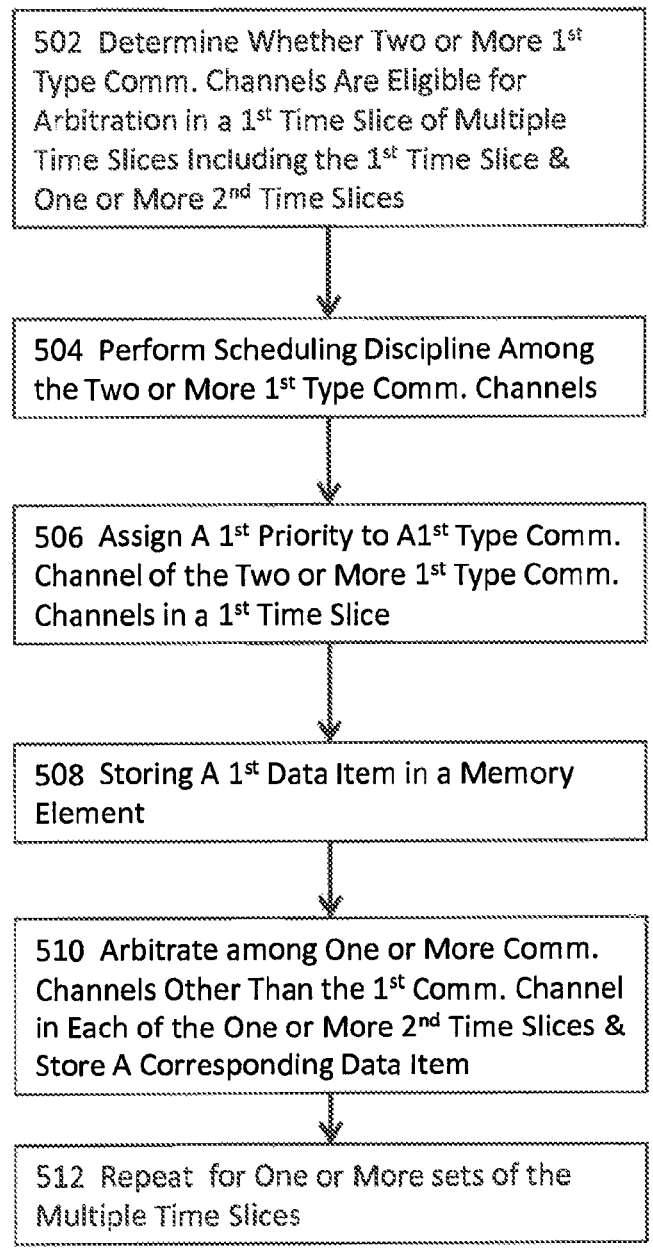
FIG. 5 illustrates more details of a high level flow diagram of a process for handling data flow from a plurality of communication channels in some embodiments.

FIG. 5 illustrates more details of a high level flow diagram of an approach for handling data flow from a plurality of communication channels such as one or more physical communication channels, one or more virtual communication channels, or a combination thereof between the one or more ingress ports and the coherency unit, the messaging network, or the interrupt controller illustrated in FIG. 9 in some embodiments. In one or more embodiments, the approach for handling data flow from a plurality of communication channels may comprise the respective process or module 502 of determining whether two or more first-type communication channels are eligible for arbitration in a first time slice of a set of multiple time slices that include the first time slice and one or more second time slices. In various embodiments, the approach determines whether a communication channel of a specific type is eligible for arbitration in the first time slice by determining whether the communication channel of the specific type is sending data item for storage into the memory element during a particular time slice. For example, the approach may determine whether two or more first-type communication channels are eligible for arbitration in the first time slice by determining whether two or more data items are present for storage into the memory element during the first time slice in some embodiments. In some embodiments, the approach may further comprise the respective process or module 504 of perform scheduling discipline among the two or more first-type communication channels.

In some embodiments, performing the scheduling discipline may comprise implementing a round-robin scheduling scheme, a weighted round-robin scheduling scheme, a deficit round-robin scheduling scheme, or any other scheduling schemes. In some embodiments, the approach may further comprise the respective process or module 506 of assigning a first priority to a first-type communication channel of the two or more first-type communication channels. In some embodiments, a communication channel of any type that is transmitting data for the purpose of various methods or systems disclosed herein may be considered as eligible for arbitration. In some embodiments, the approach may further comprise the respective process or module 508 of storing a first data item from the first-type communication channel, which has been assigned the first priority, in a memory element such as one or more of the memory banks (910) illustrated in FIG. 9.

In some embodiments where the memory element comprises a plurality of memory banks starting with, for example memory bank 0 of 910 in FIG. 9 as the lowest memory address, the approach may store the first data item starting at bank 0 and occupy one or more contiguous memory banks until the first data item is completely stored within the memory element. In some embodiments, the approach may further comprise the respective process or module 510 of arbitrating among one or more communication channels other than the first-type communication channel in each of the one or more second time slices and storing a data item from one of the one or more communication channels that is selected by the action of arbitrating among the one or more communication channels. More details about the respective process or module 510 will be described in some of the subsequent paragraphs with reference to one or more figures. In some embodiments, the approach may further comprise the respective process or module 512 of repeating the actions 502-510 for one or more sets of the multiple time slices in a substantially similar manner as that described for the respective process or module 408.

Figure 6:
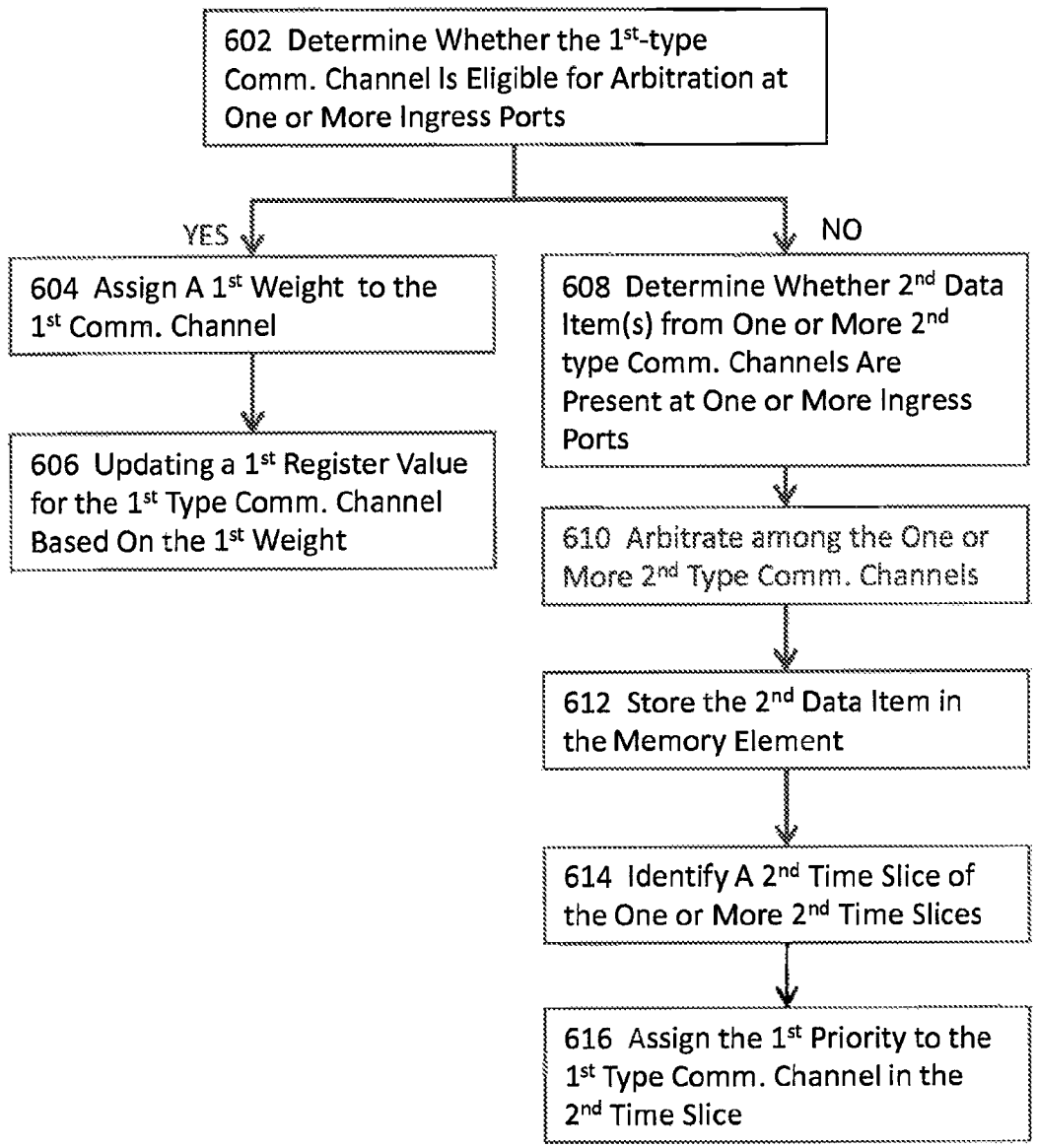
FIG. 6 illustrates more details of an approach for handling data flow from a plurality of communication channels illustrated in FIG. 4 or FIG. 5 in some embodiments.

FIG. 6 illustrates more details of a process, hardware module, or combinations thereof for handling data flow from a plurality of communication channels illustrated in FIG. 4 or FIG. 5 in some embodiments. More specifically, FIG. 6 illustrates more details about the previously described 402 or 506 in some embodiments. In some embodiments, the process or module 402 or 506 may comprise the respective process or module 602 of determining whether a first data item from the first-type communication channel is present at, for example, one or more ingress ports of the system or whether the first-type communication channel is eligible for arbitration.

In some embodiments where the approach determines that the first-type communication channel is eligible for arbitration or the first data item is present, the approach may comprise the respective process or module of 604 of assigning a first weight to the first-type communication channel. In these embodiments, the respective process or module 606 of updating a first register value for the first-type communication channel based at least in part upon the first weight that is assigned at 604. In an example where the system may include one 4-bit register (e.g., a register interconnected to the logic module 910 for each communication channel in FIG. 9 or in the interchip interface engine $211_0$ or $211_1$ for each communication channel in FIG. 3) for the scheduling weight or arbitration weight of each communication channel, the approach may set the register value to reflect the weight assigned to a communication channel. In some embodiments, higher weight indicates that more time slice(s) or higher priority will be assigned to the corresponding communication channel.

In some embodiments where the approach determines that the first communication channel is not eligible for arbitration, a process or module 608 determines whether one or more second data items from one or more second-type communication channels is present or whether a second-type channel is eligible for arbitration. In these embodiments, the process or module 402 or 506 may comprise the respective process or module of 610 of arbitrating among the one or more second-type communication channels. In some embodiments, the process or module 402 or 506 may comprise the respective process or module of 612 of storing a second data item from a second-type communication channel that wins the arbitration in the memory element.

In some embodiments where the memory element includes a plurality of memory banks (e.g., reference character 920 of FIG. 9), the approach stores the second data item starting from an even number memory bank. In some embodiments where the memory element includes a plurality of memory banks, the approach stores the second data item starting from an odd number memory bank. In some embodiments, the process or module 402 or 506 may comprise the respective process or module 614 of identifying a second time slice of the one or more second time slices and the respective process or module 616 of assigning a first priority to the first-type communication channel in the second time slice. In some embodiments, the approach performs a context swap to assign the first priority to the first-type communication channel rather than to a second-type communication channel in a second time slice.

Figure 7:
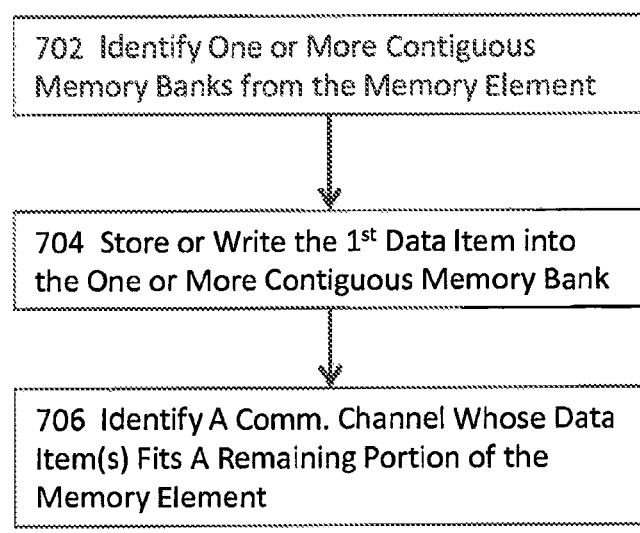
FIG. 7 illustrates more details of an approach for handling data flow from a plurality of communication channels illustrated in FIG. 4 or FIG. 5 in some embodiments.

FIG. 7 illustrates more details of an approach for handling data flow from a plurality of communication channels illustrated in FIG. 4 or FIG. 5 in some embodiments. More specifically, FIG. 7 illustrates more details for the process or module of storing a first data item in a memory element in one or more embodiments. In some embodiments, the process or module 404 or 508 may comprise the respective process or module 702 of identifying one or more contiguous memory banks or a block of contiguous memory area in the memory element. In some embodiments, the process or module 404 or 508 may comprise the respective process or module 704 of storing or writing the first data item into the one or more contiguous memory banks or the block of contiguous memory area in the memory element. In some embodiments, the process or module 704 stores or writes the first data item from the beginning (e.g., bank0 with the lowest memory address of a plurality of memory banks) of the memory element. In some embodiments, the process or module 404 or 508 may comprise the respective process or module 706 of identifying a communication channel whose data item fits the remaining portion of the memory element to improve the utilization of the memory element or to better match the input data rate with the output data rate of the system.

Figure 8:
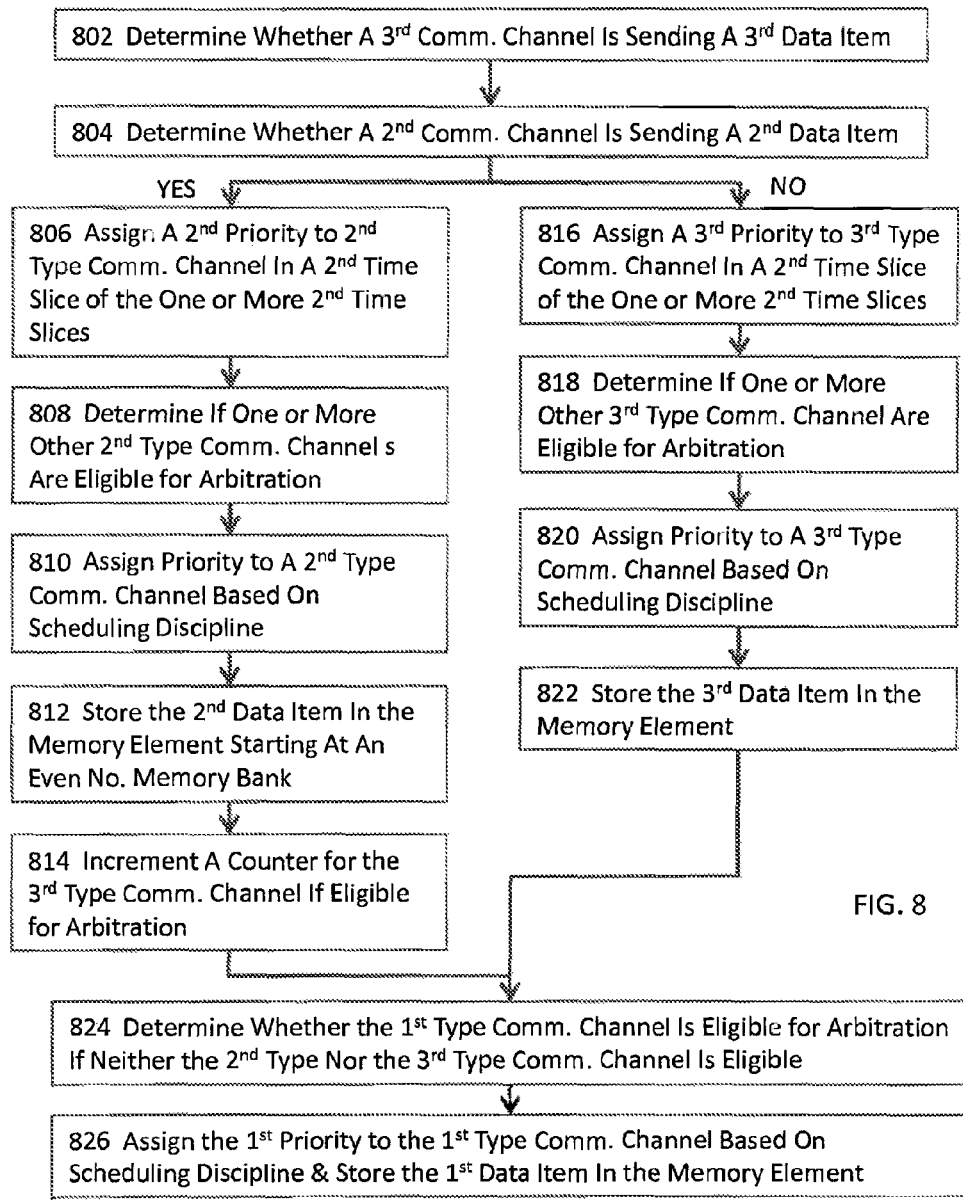
FIG. 8 illustrates more details of an approach for handling data flow from a plurality of communication channels illustrated in FIG. 4 or FIG. 5 in some embodiments.

FIG. 8 illustrates more details of an approach for handling data flow from a plurality of communication channels illustrated in FIG. 4 or FIG. 5 in some embodiments. More particularly, FIG. 8 illustrates more details about the process or module 406 or 510 respectively illustrated in FIGS. 4 and 5. In one or more embodiments, the process or module 406 or 510 may respectively comprise the respective process or module 802 of determining whether a third-type communication channel such as a physical communication channel or a virtual communication channel between the one or more ingress ports 912 and the coherency unit 904, the messaging network 906, or the interrupt controller 908 illustrated in FIG. 9 is eligible for arbitration or whether a third data item from a third-type communication channel is present for storage into the memory element.

In some embodiments, the process or module 406 or 510 may respectively comprise the respective process or module 804 of determining whether a second-type communication channel is eligible for arbitration by determining whether a second data item from a second-type communication channel is present for storage into the memory element. In some embodiments where the process or module 406 or 510 determines that the second-type communication channel is eligible for arbitration, the process or module 406 or 510 may respectively comprise the respective process or module 806 of assigning a second priority to a second-type communication channel in a second time slice of the one or more second time slices.

In these embodiments, the process or module 406 or 510 may respectively comprise the respective process or module 808 of determining whether there exist two or more second-type communication channels that are eligible for arbitration. In some embodiments, the process or module 406 or 510 may respectively comprise the respective process or module 810 of assigning a second priority to a second-type communication channel based upon some scheduling principle. In some embodiments where there exists only one second-type communication channel, the process or module 406 or 510 assigns the second priority to the single second-type communication channel without performing scheduling discipline.

In some embodiments, the process or module 406 or 510 may respectively comprise the respective process or module 812 of storing the second data item from the second-type communication channel, which has been assigned the second priority, in the memory element. In some embodiments where the memory element comprises a plurality of memory banks, the process or module 812 stores the second data item in the memory element starting at an even number memory bank. In some embodiments, the process or module 406 or 510 may respectively comprise the respective process or module 814 of incrementing a counter, which may be implemented within the interchip interface engine $211_0$ or $211_1$ of FIG. 3 or may be interconnected to or accessible by the logic module 910 of FIG. 9, for the third-type communication channel, which has been determined to be eligible for arbitration at 802. In these embodiments, the approach may further include the respective process or module of checking the counter value against a predetermined threshold value beyond which the third-type communication channel will be assigned a higher priority such that its data items may be processed earlier.

In some embodiments where the process or module 804 determines that the second-type communication channel is not eligible for arbitration, the process or the module 406 or 510 may comprise the respective process or module 816 of assigning a third priority to a third-type communication channel (e.g., a physical communication channel or a virtual communication channel between the one or more ingress ports and the coherency unit 904, the messaging network 906, or the interrupt controller 908 illustrated in FIG. 9) in the second time slice of one or more second time slices if the third-type communication channel is determined to be eligible for arbitration. In these embodiments, the process or module 406 or 510 may further comprise the respective process or module 818 of determining whether or not more than one third-type communication channels are eligible for arbitration and the respective process or module 820 of assigning priority to a third-type communication channel based at least upon some scheduling discipline.

In some embodiments where there is only one third-type communication channel that is determined to be eligible for arbitration, the process or the system does not perform the scheduling discipline and assigns the third priority to the only eligible third-type communication channel. In these embodiments, the process or module 406 or 510 may further comprise the respective process or module 822 of storing the third data item from the third-type communication channel in the memory element.

In some embodiments where neither the second-type nor the third-type communication channel is eligible for arbitration, the process or module 406 or 510 may further comprise the respective process or module 824 of determining whether the first-type communication channel is eligible for arbitration. In one or more embodiments where the first-type communication channel is determined to be eligible for arbitration, the process or module 406 or 510 may further comprise the respective process or module 826 of determining whether more than one first-type communication channel is eligible for arbitration, performing some scheduling discipline among the eligible first-type communication channels, assigning a first priority to the first-type communication channel, and storing the first data item from the first-type communication channel in the memory element.

Figure 10:
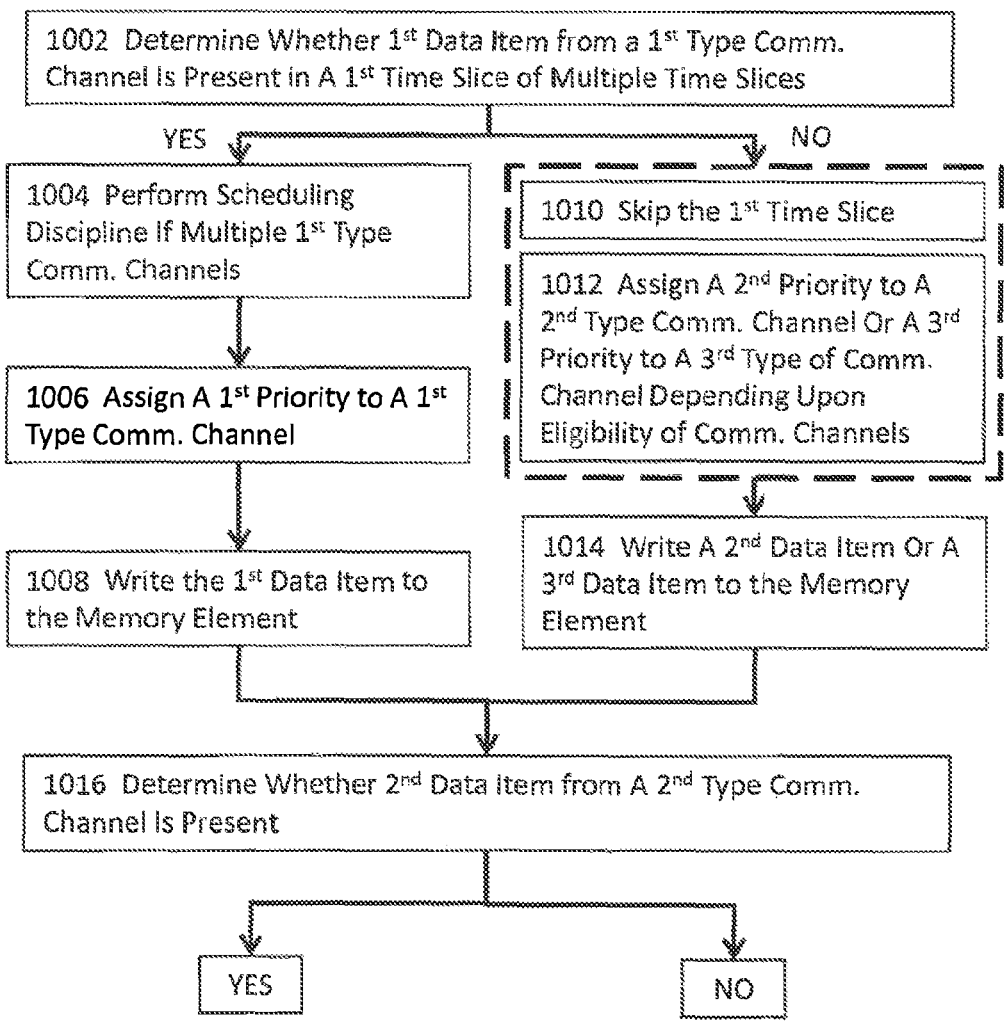
FIG. 10 illustrates an exemplary implementation of a process for handling data flow from a plurality of communication channels in some embodiments.
Figure 10:
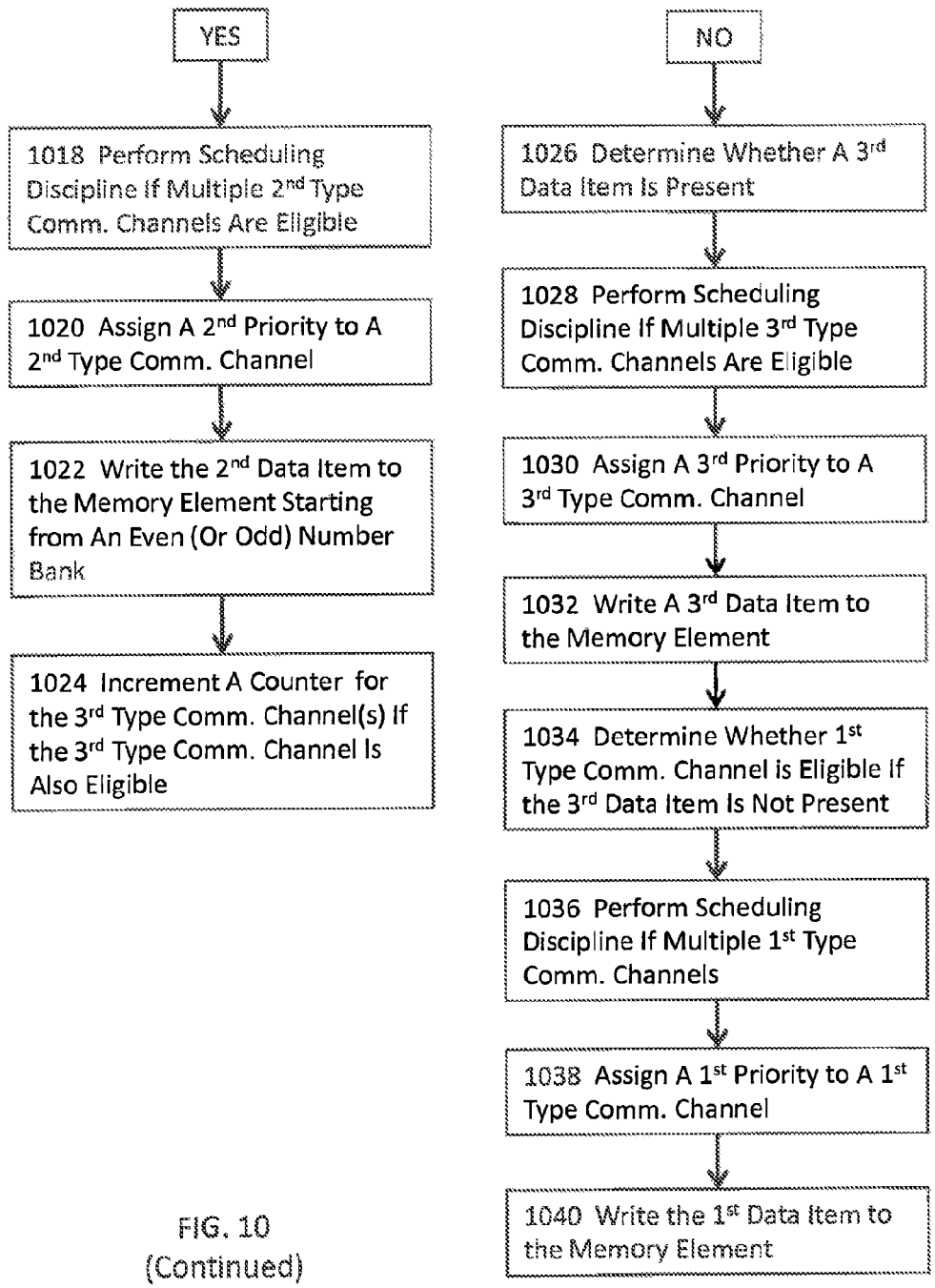

FIG. 10 illustrates an exemplary implementation of a process for handling data flow from a plurality of communication channels in some embodiments. The description of FIG. 10 will be based on the exemplary hardware structure illustrated in FIG. 9 for illustration and explanation purposes only.

In this exemplary implementation, one or more of the communication channels corresponding to the coherence unit 904 are considered to be of the first type and are assumed to have a first (e.g., 144-bit) datapath width; each of the communication channels corresponding to the messaging network 906 is considered to be of the second type and is assumed to have a second (e.g., 64-bit) datapath width narrower than (e.g., less than half) the first width; the communication channel corresponding to the interrupt controller 908 is considered to be of the third type and is assumed to have a third (e.g., 32-bit) datapath width narrower than (e.g., half of) the second width; and each memory bank is assumed to have the third (e.g., 32-bit) width, for the ease of explanation and illustration.

In some embodiments, the approach may comprise the process or module 1002 for determining whether the first-type communication channel is eligible for arbitration. In some embodiments where the first-type communication channel is eligible, the approach allocates one dedicated time slice (a first time slice) to the first-type communication channel out of a set of time slices. In some embodiments, the approach comprises the process or module 1004 of performing scheduling discipline if multiple first-type communication channels are eligible for arbitration. In some embodiments, there exists only one first-type communication channel in each processing system.

In some embodiments, the approach comprises the process or module 1006 of assigning a first priority to the first-type communication channel. In some embodiments, the approach comprises the process or module 1008 of writing the first data item from the first-type communication channel to the memory element (e.g., memory element 910). In some embodiments where the memory element comprises a plurality of memory banks, the approach writes the first data item into the memory element starting at bank 0.

In some embodiments where the first-type communication channel is not eligible for arbitration during the first time slice, the approach comprises the process or module 1010 of skipping the storage of data items in the first time slice.

In some embodiments, the approach comprises the process or module 1012 of assigning a second priority to a second-type communication channel or a third priority to a third-type communication channel depending upon whether the second-type communication channel is eligible for arbitration and regardless of whether or not the third-type communication channel is eligible as long as the second-type communication channel is eligible. For example, if a second-type communication channel is eligible for arbitration, the process or module 1012 assigns priority to the second-type communication channel regardless of whether a third-type communication channel is eligible for arbitration in some embodiments. In some embodiments where none of the second-type communication channel are eligible for arbitration, the process or module 1012 assigns a third priority to a third-type communication channel in some embodiments. In some embodiments, the approach comprises the process or module 1014 of writing a second data item or a third data item into the memory element based at least in part upon a result of the process or module 1012.

In some embodiments, the approach comprises the process or module 1016 of determining whether or not a second-type communication channel is eligible for arbitration or whether or not a second data item from a second-type communication channel is present for storage.

In some embodiments where the second-type communication channel is determined to be eligible for arbitration, the approach comprises the process or module 1018 of performing scheduling discipline if multiple second-type communication channels are eligible for arbitration. In these embodiments, the approach may further comprise the process or module 1020 of assigning a second priority to a second-type communication channel. In some embodiments, the approach may further comprise the process or module 1022 of writing the second data item from the second communication channel into the memory element.

In some embodiments where the memory element includes multiple memory banks, the process or module 1020 may write or store the second data item, which has a width equal to the width of two banks, into the memory element starting at an even number memory bank (e.g., bank 0, 2, 4, ...) or starting at an odd number memory bank (e.g., bank 1, 3, 5, ...). In some embodiments, the approach may further comprise the process or module 1024 of incrementing a counter (which is not shown in FIG. 9 but may be interconnected to, for example, the third-type communication channel between the corresponding ingress port 912 and the memory element 910 or to the logic module 920 of FIG. 9) for the third-type communication channel if the third-type communication channel is also determined to be eligible for arbitration. In these embodiments, the approach may further include the process or module of checking the counter value against a predetermined threshold value beyond which the third-type communication channel will be assigned a higher priority such that its data items may be processed earlier.

In some embodiments where the second-type communication channel is determined not to be eligible for arbitration, the approach comprises the process or module 1026 of determining whether a third data item is present for storage in the memory element and thus whether or not a third-type communication channel is eligible for arbitration. In these embodiments, the approach may further comprise the process or module 1028 of performing scheduling discipline if multiple third-type communication channels are determined to be eligible for arbitration. In some embodiments, the approach may further comprise the process or module 1030 of assigning a third priority to a third-type communication channel.

In some embodiments, the approach may further comprise the process or module 1032 of writing a third data item from the third-type communication channel, which has been assigned the third priority, into the memory element. In some embodiments, the approach may further comprise the process or module 1034 of determining whether the first-type communication channel is eligible for arbitration if no third-type communication channels are determined to be eligible for arbitration. In some embodiments, the approach may further comprise the process or module 1036 of performing scheduling discipline if multiple first-type communication channels have been determined to be eligible for arbitration. If there exists only one first-type communication channel or only one first-type communication channel is determined to be eligible for arbitration, the approach skips 1036.

In some embodiments, the approach may further comprise the process or module 1038 of assigning a first priority to the first-type communication channel. In some embodiments, the approach may further comprise the process or module 1040 of writing or storing the first data item from the first-type communication channel into the memory element. In some embodiments where the memory element comprises a plurality of memory banks, the approach stores or writes the first data item into the memory element starting at the lowest memory address of the memory element.

While the disclosure has used reference to numerous specific details, one of ordinary skill in the art will recognize that embodiments of the disclosure may be embodied in other specific forms without departing from the spirit of the claims.

In the foregoing specification, specific embodiments have been described. It will, however, be evident that various modifications and changes may be made thereto without departing from the broader spirit and scope of the embodiments. For example, the above-described process flows are described with reference to a particular ordering of process actions. Nonetheless, the ordering of many of the described apparatus or process actions may be changed without affecting the scope or operation of the claims. The specification and drawings are, accordingly, to be regarded in an illustrative rather than restrictive sense.

I claim:

1. A method performed by a processing system that comprises at least one interchip interface module, the method comprising:

assigning a first priority to a first-type communication channel in a first time slice of a set of multiple time slices based at least in part upon a criterion, the set of multiple time slices comprising the first time slice and a second time slice;

identifying a contiguous memory area in a memory element in the interchip interface module;

storing a first data item from the first-type communication channel into the contiguous memory area in response to the first priority being assigned to the first-type communication channel;

identifying communication channels of one or more types other than the first-type comprising one or more data items that fit a remaining portion of the memory element;

arbitrating among the communication channels of one or more types other than the first-type in the second time slice; and in response to the arbitrating, storing a second data item from one of the communication channels of one or more types other than the first-type in the memory element in the interchip interface module.

2. The method of claim 1, further comprising:

determining whether or not two or more first-type communication channels are eligible for arbitration during the first time slice of the set of multiple time slices; and performing scheduling discipline among the two or more first-type communication channels, where the two or more first-type communication channels are determined to be eligible for arbitration.

3. The method of claim 1, wherein:

the criterion comprises a result of determining whether the first-type communication channel is eligible for arbitration.

4. The method of claim 3, wherein, when the first-type communication channel is eligible for arbitration, assigning the first priority to the first-type communication channel in the first time slice comprises:

assigning a first weight to the first-type communication channel; and updating a first register for the first-type communication channel based at least in part upon the first weight.

5. The method of claim 3, wherein, when the first-type communication channel is ineligible for arbitration in the first time slice, assigning the first priority to the first-type communication channel in the first time slice comprises:

determining whether one or more second-type communication channels are eligible for arbitration during the first time slice;

arbitrating among the one or more second-type communication channels;

storing a second data item from a second-type communication channel of the one or more second-type communication channels in the memory element in the first time slice;

and assigning first priority to the first-type communication channel in the second time slice.

6. The method of claim 3, wherein, when the first-type communication channel and a second-type communication channel are ineligible for arbitration in the first time slice, assigning the first priority to the first-type communication channel in the first time slice comprises:

determining whether one or more third-type communication channels are eligible for arbitration;

arbitrating among the one or more third-type communication channels;

storing a third data item from a third-type communication channel of the one or more third-type communication channels in the memory element in the first time slice;

and assigning the first priority to the first-type communication channel in the second time slice.

7. The method of claim 1, wherein the first data item is stored into the contiguous memory area starting at a lowest memory address of the contiguous memory area.

8. The method of claim 1, wherein arbitrating among the communication channels other than the first-type communication channel in the second time slice comprises:

determining whether one or more second-type communication channels are eligible for arbitration in the second time slice;

determining whether one or more third-type communication channels are eligible for arbitration in the second time slice; and determining whether one or more first-type communication channels are eligible for arbitration when the one or more second-type communication channels and the one or more third-type communication channels are ineligible for arbitration.

9. The method of claim 8, wherein determining whether the one or more second-type communication channels is eligible for arbitration in the second time slice comprises:

determining whether the one or more second-type communication channels comprise more than one second-type communication channel;

assigning a second priority to a second-type communication channel of the one or more second-type communication channels based on scheduling discipline; and storing a second data item in the memory element when at least one of: the one or more third-type communication channels is determined to be eligible for arbitration, and the second-type communication channel is determined to be eligible for arbitration.

10. The method of claim 9, wherein determining whether the one or more second-type communication channels is eligible for arbitration in the second time slice further comprises:

incrementing one or more counters for the one or more third-type communication channels.

11. The method of claim 9, wherein storing the second data item in the memory element comprises:

writing the second data item in the memory element starting at a lowest memory address of the memory element.

12. The method of claim 8, wherein determining whether the one or more second-type communication channels are eligible for arbitration in the second time slice comprises:

determining whether the one or more third-type communication channels comprise more than one third-type communication channel;

assigning a third priority to a third-type communication channel of the one or more third-type communication channels based on scheduling discipline; and storing a third data item from the third-type communication channel in the memory element.

13. The method of claim 1, further comprising at least one of:

transmitting, by the at least one interchip interface module, one or more data items from the processing system to another processing system; and receiving, by the at least one interchip interface module, one or more other data items at the processing system from the another processing system.

14. A processing system, comprising:

an interchip interface module comprising:

an arbitration module configured to assign a first priority to a first-type communication channel in a first time slice of a set of multiple time slices based at least in part upon a criterion, the set of multiple time slices comprising the first time slice and a second time slice, and to arbitrate among communication channels other than the first-type communication channel in the second time slice;

a memory element for storing a first data item from the first-type communication channel in response to the first priority assigned to the first-type communication channel; and logic configured to identify a contiguous memory area in a memory element in the interchip interface module, store the first data item into the contiguous memory area in response to the first priority being assigned, and identify one or more communication channels of one or more types other than the first-type comprising one or more data items that fit a remaining portion of the memory element.

15. The processing system of claim 14, wherein:

the arbitration module is further configured to determine whether the first-type communication channel is eligible for arbitration to assign the first priority.

16. The processing system of claim 15, wherein, when the first-type communication channel is eligible for arbitration, the arbitration module is further configured to:

assign a first weight to the first-type communication channel, and update a first register for the first-type communication channel based at least in part upon the first weight.

17. The processing system of claim 15, wherein, when the first-type communication channel is ineligible for arbitration in the first time slice, the arbitration module is further configured to:

determine whether one or more second-type communication channels are eligible for arbitration;

arbitrate among the one or more second-type communication channels;

store a second data item from a second-type communication channel of the one or more second-type communication channels in the memory element in the first time slice;

and assign the first priority to the first-type communication channel in the second time slice.

18. The processing system of claim 15, wherein, when the first-type communication channel and a second-type communication channel are ineligible for arbitration in the first time slice, the arbitration module is further configured to:

determine whether one or more third-type communication channels are eligible for arbitration;

arbitrate among the one or more third-type communication channels;

store a third data item from a third-type communication channel of the one or more third-type communication channels in the memory element in the first time slice;

and assign the first priority to the first-type communication channel in the second time slice.

19. The processing system of claim 14, wherein the arbitration module is further configured to:

determine whether one or more second-type communication channels are eligible for arbitration in the second time slice;

determine whether one or more third type communication channels are eligible for arbitration in the second time slice; and determine whether one or more first-type communication channels are eligible for arbitration when the one or more second-type communication channels and the one or more third-type communication channels are ineligible for arbitration.

20. The processing system of claim 19, wherein:

the first-type communication channel comprises a 144-bit datapath width;

the second-type communication channel comprises a 64-bit datapath width;

the third-type communication channel comprises a 32-bit datapath width; and the memory element includes at least five memory banks, each of which comprise a 32-bit datapath width.

* * * * *